Figure 1:
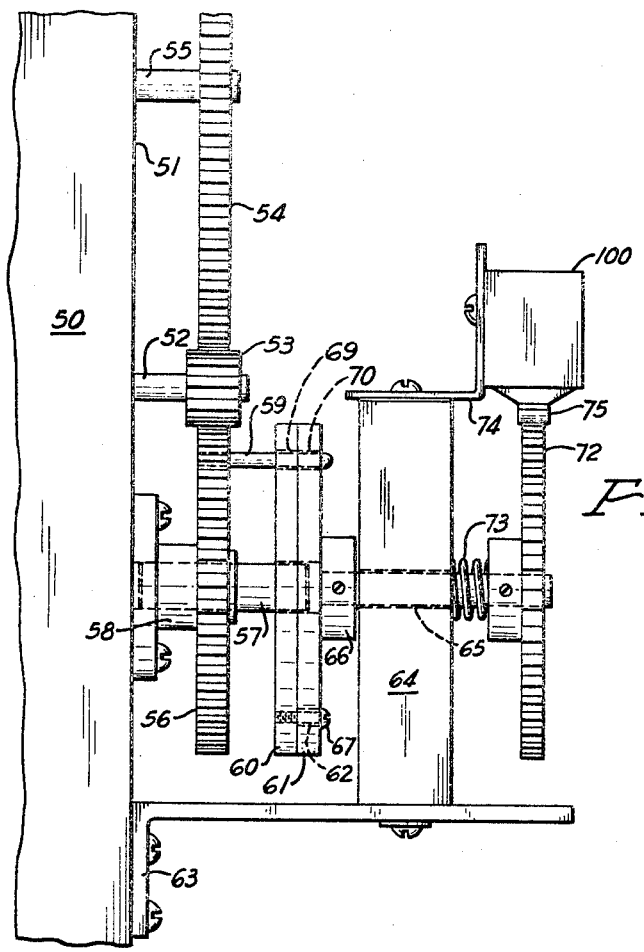

Oct. 11, 1966  E. A. SLADE ET AL  3,277,918
APPARATUS FOR THE AUTOMATIC CONTROL OF VALVES
IN A PIPELINE SYSTEM
Filed Oct. 15, 1963  2 Sheets-Sheet 1

INVENTORS.
ERNEST A. SLADE
JOSEPH C. TURK
BY
[signature]
ATTORNEY.

INVENTORS
ERNEST A. SLADE
JOSEPH C. TURK
BY
ATTORNEY

United States Patent Office 3,277,918
Patented Oct. 11, 1966

3,277,918
APPARATUS FOR THE AUTOMATIC CONTROL OF VALVES IN A PIPELINE SYSTEM
Ernest A. Slade, Tulsa, and Joseph C. Turk, Park Plaza II, Okla., assignors to Warren Petroleum Corporation, Tulsa, Okla., a corporation of Delaware
Filed Oct. 15, 1963, Ser. No. 316,325
26 Claims. (Cl. 137—119)

This invention relates to the operation of a transportation pipeline and in particular concerns apparatus useful in automatically switching the product transported by the pipeline upon arrival of a product interface at a selected destination. A more particular aspect of the invention concerns apparatus for eliminating random variations in a measuring system which in its application to pipeline switching eliminates the possibilities of false switching.

In the operation of a long transportation pipeline it is customary to have the trunk line contain a number of products which follow each other in succession through the line and which are scheduled for delivery at different way stations along the line. It is evident that when a product interface reaches a way station and the succeeding product is to be delivered at that station, appropriate valves must be operated to make the switch at the proper moment without interrupting flow in the main trunk line. Heretofore such valve operation has been largely done manually by periodically sampling and testing the product flowing by the station and manually turning the valves at the right time. While automatic operation in response to a signal from various types of interface detectors has been proposed in the prior art, these devices have heretofore not proven sufficiently dependable for reliable automatic operation. By means of this invention certain limitations and difficulties with automatic interface detecting devices for pipeline switching are overcome.

A preferred type of interface detector is a device which measures the specific gravity of the product flowing in the pipeline, such a device being called a gravitometer. Gravitometers may be of a batch type in which a known volume of product is weighed, but a continuously measuring type is preferred. In this invention it is preferred to employ a gravitometer that uses radioactive interactions at least in part in obtaining a response indicative of specific gravity, as for example by measuring the absorption of radioactive rays or particles by the product. In one such preferred type of gravitometer the product is subjected to gamma rays whose absorption by the product in the pipeline is measured. While the radioactive type of gravitometer is preferred as being the most dependable, its indication is subject to statistical random fluctuations due to the discontinuous nature of the radioactive interactions on which its indication inherently depends. In using the radioactive type of gravitometer it has been found that there is considerable "noise" or random variation of the recorded indication and that most of these variations do not reflect conditions actually existing in the a similar effect due to amplifier noise and the like, especially when adjusted to high sensitivity. Obviously such random variations must not be permitted to trigger a switching operation in automatic operation of a pipeline, and it is this problem to which this invention is directed.

Accordingly, it is an object of this invention to provide apparatus for reliably automatic pipeline switching.

It is another object of this invention to provide apparatus that substantially reduces the chance of false operation of an automatic pipeline switching system.

It is a further object of this invention to provide a simple, reliable, and inexpensive apparatus for removing the effect of random variations in a measured parameter of pipeline product so that reliable switching can be accomplished.

It is a still further object of this invention to provide apparatus capable of detecting deviations in the indication of a parameter-measuring means when such indications are subject to random variation in order that significant deviations of the parameter may be reliably employed for automatic control purposes.

It is an ancillary object of this invention to provide a means for eliminating statistical variations in the indication of a radioactive type of gravitometer so that it may be reliably employed as a product interface detector in a pipeline switching operation.

Figure 3:
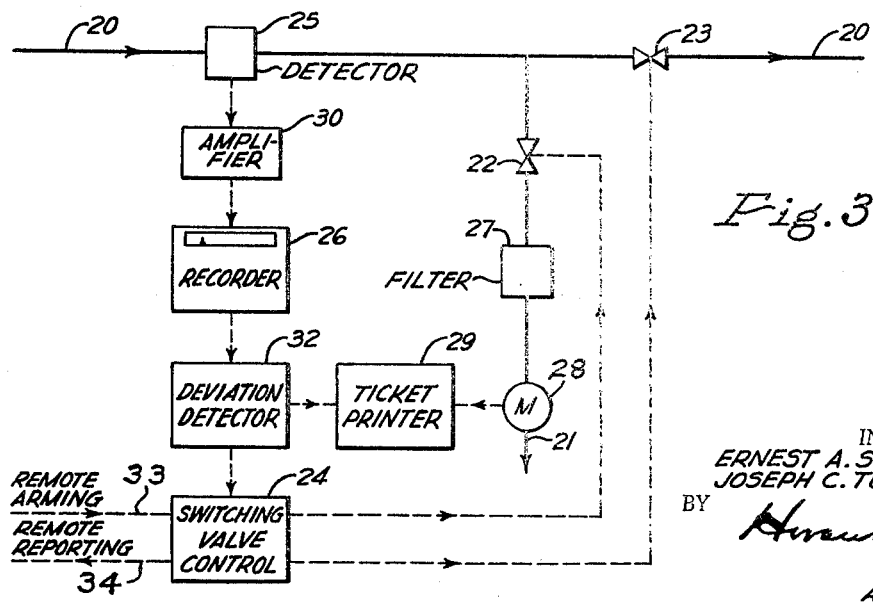
Figure 2:
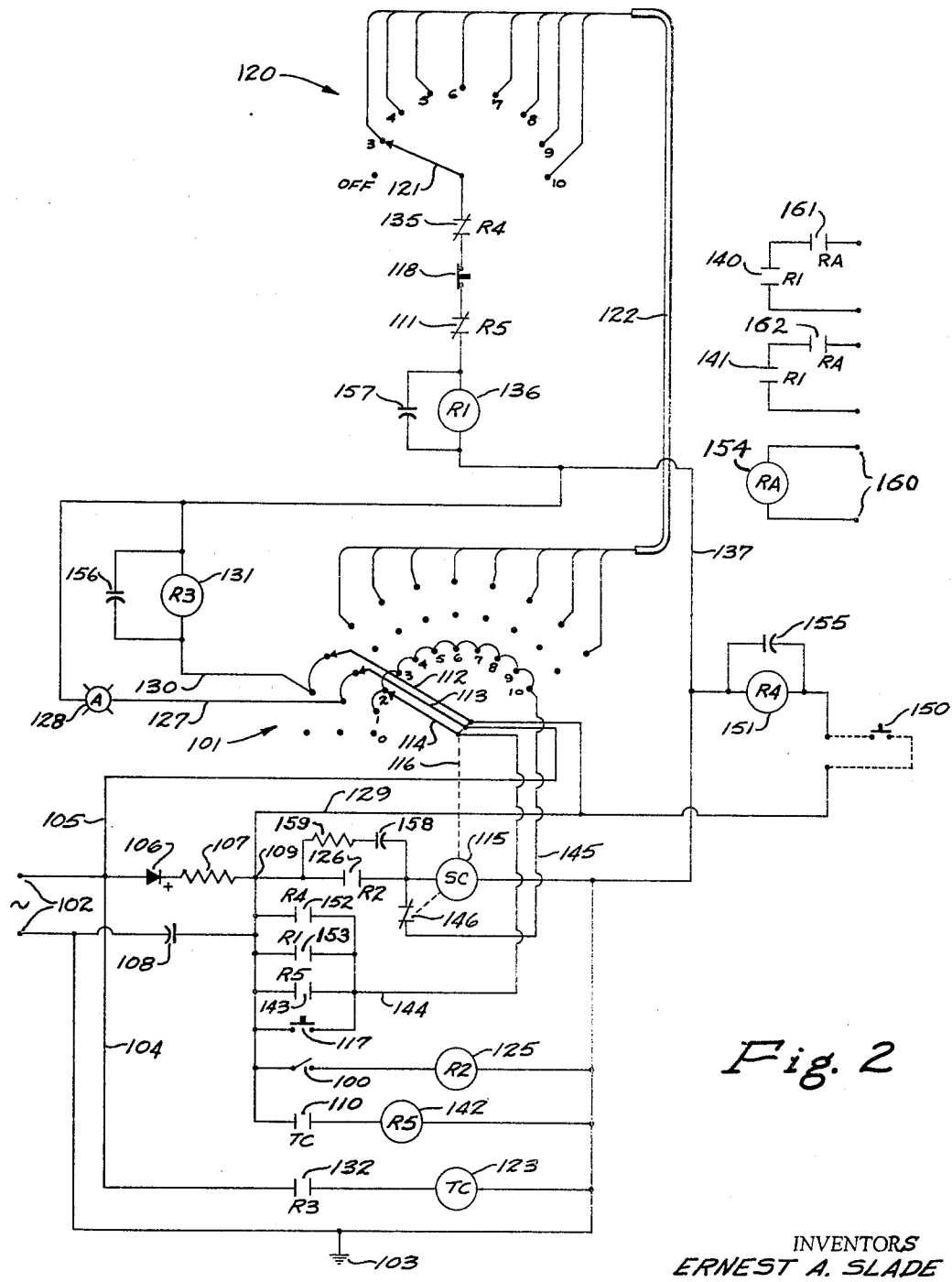

These and other useful objects of this invention are attained by the apparatus described in this specification of which the drawings form a part and in which FIGURE 1 is a diagrammatic representation of a preferred device for detecting significant deviations of a measured parameter and at the same time eliminating random fluctuations from the indication of the measured parameter of a product;

FIGURE 2 is a schematic wiring diagram of apparatus for initiating a switching operation on a pipeline in response to the deviation detector of FIGURE 1; and FIGURE 3 is a schematic diagram of the instrumentation at a pipeline station.

While the apparatus of this invention will be described as applied to a pipeline switching operation, it will become apparent to those skilled in the art that the invention may also be applied in other control operations.

The apparatus of this invention comprises means on the pipeline measuring a characteristic of the flowing product so that the product can be identified. The indicator of the measuring means is connected to a deviation detector through an adjustable mechanical lost-motion or back-lash device that is adjusted so that the normally occurring random deviations of the measuring indicator do not affect the deviation detector. When the measuring indicator moves from a norm by an amount that exceeds a predetermined minimum, the deviation detector is moved. The apparatus further has means to erase deviations that occur at a time rate slower than a predetermined minimum rate, whereby slow drift of the measured parameter is rendered ineffective. Only when a deviation of the indicated measured parameter exceeds a predetermined minimum range and when the time rate of deviation also exceeds a predetermined minimum rate is the deviation effective in producing a control action as for example a pipeline switching operation.

Referring first to FIGURE 3, there is shown a trunk pipeline 20 transporting product in the direction indicated. A lateral line 21 connects with the trunk line 20 and is provided with a lateral valve 22 that may be electrically actuated. The trunk line 20 also has an electrically actuated valve 23 located downstream from the junction of lateral 21. These valves are controlled and interlocked by a switching valve control unit 24. The control unit 24 controls the sequence of operation of valves 22 and 23; as for example, when switching from main line to lateral, the opening of valve 22 is started and when valve 22 is half open, valve 23 starts to close so that when valve 22 is fully open, the valve 23 is half closed and valve 23 then continues to close to complete the switching operation. When returning the flow to the main trunk line, a similar but reverse sequence takes place. The control unit 24 is also provided with connection to a telemeter channel 33 over which control unit 24 can be remotely set or armed for an automatic switch to be performed upon arrival of an interface. Control unit 24 is also provided with connection to a telemeter channel 34 for telemetering to a central dispatching station the positions of the respective valves 22 and 23 so that the dispatcher will know when a switch is completed.

These functions are conventional and may vary with different pipelines but do not per se form part of this invention.

In order to perform an automatic switching operation the trunk line 20 is equipped with a product interface detector 25 which may be of any known type, as for example an electric capacitance detector, but more preferably a continuous gravitometer which continuously measures the specific gravity of product flowing in pipeline 20. In this invention it is preferred to employ a radioactive absorption type of gravitometer, such as is made by Ohmart Corporation of Cincinnati, Ohio. The interface detector 25 measures a characteristic parameter of the product flowing in pipeline 20, and connects through an amplifier 30 to an indicator-recorder 26. The interface detector 25 usually includes electronic apparatus such as amplifiers, oscillators, and the like, which are conventional and are included in amplifier 30. The lateral line 21 is also provided with a filter 27 to remove foreign matter from the product. A conventional type of volumetric meter 28 in lateral line 21 is connected to and drives a meter totalizer and ticket printer 29.

Heretofore attempts have been made to control the switching valve control unit 24 directly from the indicator-recorder 26, but such an arrangement has been found unreliable. Experience has shown that the indication obtained from an interface detector that measures some characteristic parameter of the pipeline product shows fluctuations or variations that have no significance. These variations are of two general types. One type consists of fairly rapidly occurring but small variations that are due to amplifier noise, small impurities in the product, or even inherent statistical fluctuations such as occur when a radioactive type of gravitometer is employed. The other type consists of a slow drift which may arise because of temperature change of the product, or because of instrumental drift that is more or less inherent when the sensitivity of the parameter measuring instrument 25 is pushed to high sensitivity in an attempt to discriminate between products that differ only slightly. Both of these variations are indicated on recorder 26 but are not significant of an interface and of course must not initiate a switching operation.

In an attempt to eliminate the effects of rapid fluctuations there have been proposed electronic linear deviation detecting devices that have a threshold which must be exceeded in order to actuate them. These devices are in themselves complex and unreliable devices that are unsuited to the rugged service of pipeline operation. Furthermore, being linear devices they give rise to a large signal immediately that the threshold is exceeded. Such devices therefore leave much to be desired and they have not proved satisfactory in pipeline operation.

The present invention employs a special kind of deviation detector 32 to be described and which is connected between the indicator-recorder 26 and the switching valve control unit 24. The deviation detector 32 of this invention may also be connected to the head of the ticket printer totalizer 29. The deviation detector 32 of this invention ignores fluctuations that are not significant but detects significant deviations that indicate a product interface. It comprises a simple mechanical lost-motion device that renders the deviation detector unaffected by fluctuations of the indicated parameter that are so small as to have no significance, and it further comprises means for periodically erasing slow fluctuations or drift that also have no significance.

A preferred embodiment of the lost-motion or backlash device employed in this invention is shown in FIGURE 1. The back of the recorder 26 is indicated by 50 only a portion being shown with the rear panel being indicated by the line 51. The recorder rebalancing motor shaft 52 extends a short distance outward from the rear panel 51 of the recorder mechanism and is customarily provided by the recorder manufacturer with a pinion 53.

The pinion 53 usually engages a much larger gear 54 whose shaft 55 drives a potentiometer or slide wire (not shown) connected in the recorder circuit as provided by the recorder manufacturer. On the opposite side of pinion 53 so as not to interfere with gear 54 the invention provides a gear 56 that engages the pinion 53. The gear 56 is carried on a shaft 57 that rotates in a bearing mount 58 which is fastened to the rear panel 51 of the recorder as by means of screws as shown. The bearing mount 58 may be provided with ball bearings (not shown) so that the gear 56 turns freely when driven by the recorder pinion 53. The gear shaft 57 extends outward a short distance for a purpose that will become evident later. A crank pin 59 is fastened to the gear 56 and extends outward through two disks 60 and 61.

A right-angle bracket 63 is fastened to the rear panel 51 of the recorder by means of screws as shown and carries a block 64 of insulating material such as plastic. The block 64 is fastened to the bracket by means of screws as shown, and it is convenient to drill oversize screw holes in the bracket 63 so as to provide a slight degree of adjustment in the position of block 64. The block 64 is drilled for a shaft 65 having pinned thereto at one end a hub 66 to which the disk 61 is fastened as by soldering. Alternatively, the disk 61 and hub 66 may be made of one piece.

The disk 60 is fastened to disk 61 by means of a screw 67 that goes through an arcuate clearance slot 62 in disk 61 and the screw 67 is threaded into disk 60. By this means the angular relationship of disks 60 and 61 may be adjusted by loosening screw 67 and rotating one disk with respect to the other after which screw 67 is again tightened. The disks 60 and 61 are centered by the outward extension of shaft 57 previously mentioned. The center holes in disks 60 and 61 are made slightly larger than the diameter of shaft 57 so that the disks 60 and 61 do not bind on the shaft 57. Each of the disks 60 and 61 has an arcuate slot 69 and 70, each slot being wide enough so that the pin 59 may ride back and forth in the slots without binding. The slot 70 in disk 61 is located diametrically opposite to the slot 62, and one end of slot 69 in disk 60 is located substantially diametrically opposite to the tapped hole for screw 67. All of the slots 62, 69, and 70 have substantially the same arcuate spread. It is apparent that by means of this arrangement the operator can angularly adjust one disk with respect to the other, whereby the operator can adjust the arcuate freedom allowed pin 59 in the superposed slots 69 and 70. It is evident that any rotation of gear 56 that is less than the arcuate freedom of pin 59 in the superimposed slots 69 and 70 will not cause rotation of the disks 60 and 61, and shaft 65 on which the disks are carried will not be moved.

The right-hand end of shaft 65 as seen in FIGURE 1 has pinned thereto a toothed cam 72, which may have the form of a coarse pitch gear. A spring 73 under slight compression is provided between the bearing block 64 and the hub of cam 72 to provide slight friction and thereby prevent shaft 65 and the elements mounted thereon from rotating except when driven by pin 59. At the top of block 64 is mounted a right-angle bracket 74 to which is fastened a conventional microswitch 100 that is actuated by an arm and roller 75 engaging cam 72. The teeth and spaces of cam 72 are sufficiently large to cause the switch roller 75 to ride up and down a sufficient amount to actuate the switch 100. It is apparent that motions of gear 56 that are smaller than a predetermined amount do not affect the switch 100, whereas motions of gear 56 that exceed this amount will actuate switch 100 a number of times in proportion to such excess motion of gear 56. In this manner the deviations detected by switch 100 do not register normally occurring random variations of the measured parameter as indicated by the recorder 50, but the recorder 50 nevertheless continually indicates and records all variations of the measured parameter. The arcuate freedom of pin 59 determines the amount of lost motion permitted. A lost motion that will take out normally occurring fluctuations is easily adjusted by the operator by loosening screw 67, rotating the disks 60 and 61 to reduce the lost motion spread and with screw 67 loose letting the random fluctuations of pin 59 increase the lost motion spread to the normal amount after which screw 67 is tightened. Subsequently, whenever the recorder indication deviates from its norm by an amount sufficient for pin 59 to move the disks, the cam 72 will actuate the microswitch 100 which is connected in an electric circuit to be described.

The manner in which the deviation detector of this invention erases the effect of slow drift of the measured parameter will be explained with reference to FIGURE 2. Due to a variety of conditions the indication of the parameter-measuring system may slowly drift, especially if the measurement is being made to a high degree of precision. Such things as power-supply voltage, temperature and the like are well known to affect such measuring systems. In addition there may be a slow drift in the actual value of the parameter. For example, in pipeline operation the pipeline may be shut in for several hours during which time certain parts of the contained product may change temperature and thereby show a slightly different parameter, e.g. specific gravity. When pumping is subsequently resumed, such changes will be measured and recorded by the indicator 26 employed, but these changes must not initiate a switching operation. Accordingly, the circuit of FIGURE 2 provides for noting but subsequently erasing pulses of switch 100 which occur at a rate less than a predetermined minimum. Further the apparatus of FIGURE 2 provides the operator means to adjust the magnitude of the parameter deviation measured in terms of number of pulses of switch 100, to which the switching valve control unit 24 is to respond.

Operation of the electrical components of the deviation detecting apparatus is shown in the circuit diagram FIGURE 2. The circuit comprises a number of relay coils with contacts connected as shown, together with a three-level stepping switch indicated generally by 101, and a manually set selector switch indicated generally by 120. Power is supplied to the circuit at terminals 102 as 115 volt 60 cycle A.C. One of the terminals 102 is grounded as indicated at 103. The circuit requires both A.C. and D.C. and it is apparent that leads 104 and 105 carry A.C. A half-wave rectifier 106 is provided to supply D.C. which is filtered by means of resistor 107 and condenser 108. Accordingly, the junction point 109 carries positive D.C. with respect to ground 103. In the diagram conventional designations are used for normally open relay contacts, as for example contacts 110 and 132 and for normally closed relay contacts, as for example contacts 111 and 135. The respective relay contacts are marked to indicate the relay coil by which the contacts are operated, this being conventional notation.

The stepping switch 101 is provided with three contact arms 112, 113, and 114. The arms 112–114 are insulated from each other and separately connected in the circuit as indicated, but they are all simultaneously stepped in unison by means of the stepping coil 115 as indicated by the dashed line 116. The arms 112–114 step progressively from 0 to 10 by units and then continue directly from position 10 to position 0, the switch 101 being shown in FIGURE 2 as semicircular merely in the interest of simplifying the diagram. The mechanism of stepping switch 101 is also provided with self-actuated interrupter contacts 146 whose purpose and operation will be described in detail later. In FIGURE 2 the stepping switch 101 is shown on position number 2 but this is merely for purposes of illustration. The so-called "home" position of the switch is marked position 0.

A two-circuit pushbutton designated as 117–118 is provided having normally open contacts 117 and normally closed contacts 118 arranged so that when the pushbutton is pressed the contacts 117 close and contacts 118 open. The purpose of the pushbutton 117–118 will be explained later.

A selector switch indicated generally by 120 is provided in order that the operator may select the number of pulses from the deviation detector microswitch 100 which he desires to have initiate the pipeline switching operation. The arm 121 of the selector switch 120 is manually set on one of the numbered contact points which are respectively connected by cabled wires 122 to similarly numbered contacts on the stepping switch 101. In FIGURE 2 the selector switch allows setting to a minimum of three pulses of switch 100 corresponding to the third step of stepping switch 101, but switch 120 may be wired to permit any minimum number of steps of the stepping switch as will become evident.

A timer 123 is provided which is of the type having normally open contacts 110 which close at the end of a timed interval. In the event that the timer 123 does not run to the end of its timed interval, it returns to zero leaving the contacts 110 open. The length of the timed interval employed depends on the particular application, but for pipeline switching the timed interval may be of the order of several minutes, as for example ten minutes.

Initially the stepping switch 101 will be in its home position, i.e. the position marked 0. Let it be assumed that the indication of gravitometer recorder 26 of FIGURE 3 (or gear 56 of FIGURE 1) attains a deviation sufficiently large to exceed the gap in the lost motion device of FIGURE 1 so as to rotate the cam 72 and actuate the microswitch 100 whereby its contacts 100 are closed and subsequently reopened. D.C. power is thus applied from point 109 to relay coil 125. Energization of coil 125 closes contacts 126 in series with the coil 115 of the stepping switch 101, thus applying D.C. power to the stepping coil 115. The stepping mechanism of switch 101 is of the type which progresses one step upon release of power from its coil 115, so that when the microswitch 100 drops into the space between teeth on the cam 72 and the relay coil 125 is de-energized (thus opening contacts 126), the stepping switch 101 progresses from position 0 to position 1. It is apparent that in this position A.C. power is supplied from lead 105 to arm 113 and lead 127 which energizes a signal lamp 128 to thereby indicate an abnormal condition in the circuit. If desired, this signal may also be telemetered to the central dispatching station. At the same time D.C. power is supplied from junction point 109 through lead 129 to switch arm 112 and lead 130 to energize relay coil 131. Energization of relay coil 131 closes contacts 132 in series with the timer 123. This starts the timed interval running. Inasmuch as microswitch 100 is now open, relay coil 125 is de-energized and contacts 126 are open, thus no further stepping action occurs.

If the gravitometer deviation continues, the microswitch 100 will again be closed energizing relay coil 125 a second time. Contacts 126 are thereby closed and upon microswitch 100 opening, the stepping coil 115 will progress to the next position, numbered 2. In this condition it is seen that the signal light 128 remains lit, and D.C. from lead 129 energizes the relay coil 131 again closing contacts 132 to the timer 123. This, however, does not disturb operation of the timer 123 which continues with its timed interval previously initiated.

Assuming that the gravitometer is detecting a true interface, the indicated gravity deviation will continue, and microswitch 100 will again close and reopen. The resulting energization of relay coil 125 and closure of contacts 126 will again actuate the stepping coil 115 and switch 101 will progress to position 3. In this position the switch arm 112 is connected by one of the wires 122 to one of the terminals of the selector switch 120 and if the selector switch arm 121 is set on the position involved, a circuit will be completed through one of the leads 122, switch arm 121, normally closed contacts 135, normally closed pushbutton contacts 118, and normally closed contacts 111, to energize relay coil 136, the current returning to ground through lead 137. The relay coil 136 is one of the main control relays of the switching valve control 24 (FIGURE 3), and its energization effects closure of contacts 140 and 141 and additional similar contacts which are provided on this relay to actuate the controlled equipment comprising the pipeline switching valves, etc.

In the event that the microswitch 100 is slowly pulsed due to slow drift of the recorder indication, the number of microswitch pulses will not be sufficient to bring the stepping switch 101 into register with a previously chosen position of selector switch 120 before the timer 123 completes its timed interval, whereupon the timer contacts 110 will close at the end of the timed interval. This energizes relay coil 142 resulting in the closure of contacts 143. It is seen that in this event D.C. power is supplied to lead 144 which connects through arm 114 of the stepping switch 101 and via its inner row of contacts to lead 145. Lead 145 is connected to an interrupter contact 146 that is normally closed and which completes a circuit through the stepping coil 115. The stepping switch 101 is of the type that carries a mechanical interlock between the stepping mechanism for moving switch arms 112–114 such that when the stepping coil 115 is energized the contacts 146 are opened and when the stepping coil 115 is de-energized the arms 112–114 move to the next position and the contacts 146 are reclosed. Accordingly, if contacts 143 are closed because the timer 123 has run to the end of its timed interval, the D.C. power supplied through lead 144, switch arm 114, and lead 145 will actuate the stepping coil which will then by its self-interrupting feature continue to step full sequence until the switch arms 112–114 return to the home position 0. Attention is called to the fact that relay coil 136 will not be energized during this sequence for the reason that normally closed contacts 111 which are part of the relay 142 will be open so that relay coil 136 cannot initiate a switching operation. Thus the timer 123 acts to erase the effect of pulses from switch 100 that occur at a rate too slow to signify passage of an interface.

Provision is also made to manually reset the selector switch 101 by means of pushbutton 117–118. If the local operator desires to reset switch 101 from an abnormal condition when indicated by light 128, he may depress pushbutton 117–118 which closes contacts 117 and at the same time opens contacts 118. From the circuit it is seen that this initiates the self-interrupted stepping sequence of selector switch 101 until the switch arms 112–114 return to the home position 0. Note that when the pushbutton closes contacts 117 it also opens contacts 118, so that relay 136 is not energized and no switching operation is initiated.

Provision is further made for a remote reset operation. In the event that an operator at the supervisory or dispatching station wishes to reset the stepping switch 101 he may close pushbutton 150. This energizes relay coil 151 which closes contacts 152. It is seen that this again initiates the self-interrupted operation of the selector switch 101 and thereby returns the switch 101 to its home position 0. Note that in this situation normally closed contacts 135 of relay 151 are open, so that relay coil 136 is not energized and no switching operation is initiated.

The stepping switch is also reset whenever a switching operation is initiated through energizaztion of relay coil 136. Closure of contacts 153 on this relay initiate the self-interrupted operation of selector switch 101 in a manner similar to closure of contacts 152.

As a safety feature, the pipeline switching apparatus is armed by remote control from the dispatching station by energization of relay coil 154 connected at terminals 160 in an appropriate telemeter channel indicated by 33 in FIGURE 3. The relay 154 may have a self-energizing contact (not shown) so that it is held self-energized until the switching operation is completed. The contacts 161 and 162 of relay 154 are in series with contacts 140 and 141 that are closed by relay 136, so that the relay 154 serves to arm the switching valve control unit 24 (FIGURE 3). Accordingly, the relay 154 is part of the main switching valve control unit 24. An interlock may be provided between the circuit of channel 33 and the remote reset pushbutton 150 so that the stepping switch will automatically be reset immediately prior to an arming signal.

As an added safety feature, the internal circuits of gravitometer 25, its amplifier 30, as well as amplifier and other circuits of recorder 26 are so arranged that upon failure of any component the pen of recorder 26 is driven either to zero or full scale indication. Limit switches (not shown) are provided at these limits which switches set up an alarm on the dispatcher's control panel so that the fault can be promptly attended to and so that the dispatcher will not arm the switching valve control unit 24 by energizing relay 154. A power failure is similarly indicated to the dispatcher. In the event that the fault or failure is not corrected by the time a product switch is required, the switching may be done manually under direction of the dispatcher by reference to a surveillance and monitoring apparatus described and claimed in copending application by Ernest A. Slade, Ser. No. 316,248, filed on Oct. 15, 1963, and assigned to the same assignee as the present application.

In the circuit of FIGURE 2 the condensers 155, 156, 157, 158, as well as resistor 159 are for the purpose of suppressing sparking of the respective contacts to which they are connected.

By way of example, but not by way of limitation, components of the circuit of FIGURE 2 may have the following specification:

| Element | Component | Specification |
| --- | --- | --- |
| 120 | Selector switch | Centralab type JV9033. |
| 117–118 | Pushbutton | Two circuit, spring return. |
| 125 | | |
| 131 | | |
| 136 | Relays | Potter Brumfield, 110 v. D.C., 10,000 ohm coil, contacts as required. |
| 142 | | |
| 151 | | |
| 101 | Stepping switch | Automatic Electric Type 44, 3 deck, 110 v. D.C. coil, with self-interrupted contacts. |
| 123 | Timer | Hayden. |
| 106 | Rectifier | Type 1N1125. |
| 155 | | |
| 156 | Condensers | Electrolytic, 50 mfd., 250 v. working voltage. |
| 157 | | |
| 107 | Resistor | 47 ohms, 1 watt. |
| 108 | Condenser | Electrolytic, 30 mfd., 250 v. working voltage. |
| 100 | Microswitch | On-off type with roller actuator. |

It is apparent from the foregoing description of the apparatus of FIGURES 1 and 2 which comprises the deviation detector indicated by 32 in FIGURE 3, that no control action is effected in response to deviations of the indicator-recorder 26 unless the deivation exceeds the predetermined lost motion permitted by the apparatus of FIGURE 1, and moreover no control action is effected unless the deviation occurs at a rate that exceeds the minimum rate as determined by the selected number of deviation steps (as selected on switch 120 of FIGURE 2) within the predeterimned timed interval of timer 123. The magnitude of these minima will, of course, vary with different control applications and may be adjusted to have any desired values. The invention may thus be applied to any type of control operation and it has been found particularly advantageous in automatic pipeline switching. In pipeline operation the measured product parameter may either increase or decrease at a product interface depending on the nature of the respective products, and it is evident that the apparatus of FIGURE 1 is advantageous in this situation because its operation is independent of the direction of a significant deviation. While the apparatus of FIGURE 2 is insensitive to whether the pulsing of microswitch 100 is due to an increase or decrease of the recorded parameter, a change in direction of deviation must each time first overcome the lost-motion freedom provided by the apparatus of FIGURE 1. This results in washing out spurious deviations that may start out large enough to exceed the lost-motion freedom and subsequently back up. It is apparent that the cam 72 and on-off switch 100 can be replaced by an indicator including any directionally sensitive transducer if such is required for the control system in which the device is to be employed.

The lost-motion device of FIGURE 1 is particularly advantageous in any control system that employs a radioactive type of detector since such a detector has inherent random fluctuations due to the nature of the radioactive processes on which its operation depends. At high sensitivity these fluctuations are exhibited by the indicator connected thereto. By employing this invention the control system is made unresponsive to such fluctuations without impairing the sensitivity of the system to significant deviations of the indicator. Thus by way of example, when using an Ohmart Model RTS-P Nuclear Gage with a radiation source of 150 millicuries of cesium 137 in measuring the specific gravity of liquid in a 6⅝ inch pine and with the gage connected to a Beckman Model V-2 amplifier operating into a Brown Electronik recorder to record specific gravities in the range 0.500 to 0.850, it is found that the recorder pen will have a normal fluctuation of about ⅛ inch even under optimum conditions of the apparatus. This corresponds to about 5° motion of gear 56 of FIGURE 1. It is apparent that with the disks 60 and 61 adjusted so that the pin 59 has slightly more than 5° freedom in the superposed slots 69 and 70, these normal fluctuations will be completely washed out and shaft 65 will respond only to larger deviations. The lost-motion device of this invention thus prevents random fluctuations from initiating a control action. On the other hand after a deviation has exceeded the lost-motion freedom, the system responds at its original sensitivity.

What we claim as our invention is:

1. Apparatus for the automatic control of valves in a pipeline system for switching of successive products flowing in the pipeline which comprises
    means connected to the pipeline substantially at the switching location responsive to a characteristic parameter whose value identifies the flowing product,
    indicating means connected to said parameter-responsive means,
    follower means,
    a mechanical coupling having lost-motion connecting said indicating means and said follower means, and
    an electrical network including said follower means and the pipeline valves and adapted to effect actuation of said valves when said follower is moved more than a selected amount within a predetermined elapsed time.

2. The apparatus of claim 1 wherein said parameter-responsive means is responsive to the specific gravity of the flowing product.

3. The apparatus of claim 1 wherein said parameter-responsive means employs a radioactive interaction in at least a part thereof.

4. Apparatus for the automatic control of valves in a pipeline system for the switching of successive products flowing in the pipeline which comprises
    means connected to the pipeline substantially at the switching location responsive to a characteristic parameter whose value identifies the flowing product,
    indicating means connected to said parameter-responsive means,
    follower means,
    a mechanical coupling having lost-motion connecting said indicating means and said follower means,
    movement detecting means connected to said follower means and producing an electrical signal in proportion to the movement detected, and
    an electrical network including said movement-detecting means and the pipeline valves and adapted to effect actuation of said valves when the electrical signal of said movement-detecting means exceeds a selected amount.

5. The apparatus of claim 4 wherein said parameter-responsive means is responsive to the specific gravity of the flowing product.

6. The apparatus of claim 4 wherein said parameter-responsive means employs a radioactive interaction in at least a part thereof.

7. Apparatus for the automatic control of valves in a pipeline system for switching of successive products flowing in the pipeline which comprises
    means connected to the pipeline substantially at the switching location responsive to a characteristic parameter whose value identifies the flowing product,
    indicating means connected to said parameter-responsive means,
    deviation-detecting means,
    means including a lost-motion device coupling said deviation-detecting means to said indicating means,
    transducing means connected to said deviation-detecting means responsive to the magnitude of movement thereof,
    means connected to said transducing means for selecting the magnitude of said transducer response desired to be required to initiate a switching operation in the pipeline, and
    an electrical network including said transducing means and said selecting means and the pipeline valves adapted to effect actuation of said valves when the response of said transducing means attains the selected magnitude.

8. The apparatus of claim 7 wherein said parameter-responsive means is responsive to the specific gravity of the flowing product.

9. The apparatus of claim 7 wherein said parameter-responsive means employs a radioactive interaction in at least a part thereof.

10. Apparatus for the automatic control of valves in a pipeline system for switching of successive products flowing in the pipeline which comprises
    means connected to the pipeline substantially at the switching location responsive to a characteristic parameter whose value identifies the flowing product,
    indicating means connected to said parameter-responsive means,
    deviation-detecting means,
    means including a lost-motion device coupling said deviation-detecting means to said indicating means,
    transducing means connected to said deviation-detecting means responsive to the magnitude of movement thereof,
    means connected to said transducing means for selecting the magnitude of said transducer response desired to be required to initiate a switching operation in the pipeline,
    means connected to said transducing means and to said selecting means limiting the elapsed time within which said selected magnitude of transducer response is permitted to initiate a switching operation in the pipeline, and
    an electrical network including said transducing means, said selecting means, said time-limiting means, and the pipeline valves adapted to effect actuation of said valves when the response of said transducing means attains the selected magnitude within said limited time.

11. The apparatus of claim 10, wherein said parameter-responsive means is responsive to the specific gravity of the flowing product.

12. The apparatus of claim 10 wherein said parameter-responsive means employs a radioactive interaction in at least a part thereof.

13. Apparatus for the automatic control of valves in a pipeline system for the switching of successive products flowing in the pipeline which comprises
    means connected to the pipeline substantially at the switching location responsive to a characteristic parameter whose value identifies the flowing product,
    indicating means connected to said parameter-responsive means,
    follower means,
    a mechanical coupling including an adjustable lost-motion device connecting said indicating means and said follower means,
    movement-detecting means connected to said follower means and producing an electrical signal in proportion to the movement detected,
    a signal threshold-selecting means,
    a timer adapted to register a predetermined elapsed time,
    an electrical network including said movement-detecting means, said threshold-selecting means, said timer, and the pipeline valves and adapted to effect actuation of said valves when the electrical signal produced by said movement-detecting means exceeds the selected threshold within said predetermined elapsed time.

14. The apparatus of claim 13 wherein said parameter-responsive means is responsive to the specific gravity of the flowing product.

15. The apparatus of claim 13 wherein said parameter-responsive means employs a radioactive interaction in at least a part thereof.

16. Apparatus for the automatic control of valves in a pipeline system for switching of successive products flowing in the pipeline which comprises
    means connected to the pipeline substantially at the switching location responsive to a characteristic parameter whose value identifies the flowing product,
    indicating means connected to said parameter-responsive means,
    deviation-detecting means,
    means coupling said deviation-detecting means to said indicating means,
    means in said coupling rendering said deviation-detecting means inoperative for deviations of said indicating means that are less than a predetermined minimum,
    means connected to said deviation-detecting means rendering the same inoperative for deviations of said indicating means that fail to reach a predetermined threshold within a predetermined elapsed time, and
    means connecting said deviation-detecting means and the pipeline valves adapted to effect actuation of said valves when movement of said deviation-detecting means exceeds said predetermined threshold.

17. The apparatus of claim 16 wherein said parameter-responsive means is responsive to the specific gravity of the flowing product.

18. The apparatus of claim 16 wherein said parameter-responsive means employs a radioactive interaction in at least a part thereof.

19. Apparatus for the automatic control of valves in a pipeline system for switching of successive products flowing in the pipeline which comprises
    means connected to the pipeline substantially at the switching location responsive to a characteristic parameter whose value identifies the flowing product,
    indicating means connected to said parameter-responsive means,
    deviation-detecting means,
    means including a lost-motion device coupling said deviation-detecting means to said indicating means,
    electrical pulse-generating means actuated by said deviation-detecting means,
    means connected to said pulse-generating means for selecting the number of generated pulses desired to be required to initiate a switching operation in the pipeline, and
    an electrical network including said pulse-generating means and said selecting means and the pipeline valves adapted to effect actuation of said valves when said pulse-generating means generates the selected number of pulses.

20. The apparatus of claim 19 wherein said parameter-responsive means is responsive to the specific gravity of the flowing product.

21. The apparatus of claim 19 wherein said parameter-responsive means employs a radioactive interaction in at least a part thereof.

22. Apparatus for the automatic control of valves in a pipeline system for switching of successive products flowing in the pipeline which comprises
    means connected to the pipeline substantially at the switching location responsive to a characteristic parameter whose value identifies the flowing product,
    indicating means connected to said parameter-responsive means,
    deviation-detecting means,
    means including a lost-motion device coupling said deviation-detecting means to said indicating means,
    electrical pulse-generating means actuated by said deviation-detecting means,
    means connected to said pulse-generating means for selecting the number of generated pulses desired to be required to initiate a switching operation in the pipeline,
    means connected to said pulse-generating means and to said selecting means limiting the elapsed time within which said selected number of generated pulses is permitted to initiate a switching operation in the pipeline, and
    an electrical network including said pulse-generating means, said selecting means, said time-limiting means, and the pipeline valves adapted to effect actuation of said valves when said pulse-generating means generates the selected number of pulses within said limited time.

23. The apparatus of claim 22 wherein said parameter-responsive means is responsive to the specific gravity of the flowing product.

24. The apparatus of claim 22 wherein said parameter-responsive means employs a radioactive interaction in at least a part thereof.

25. Apparatus for the automatic control of valves in a pipeline for switching of successive products flowing in the pipeline which comprises
    means connected to the pipeline substantially at the switching location responsive to a characteristic parameter whose value identifies the flowing product,
    indicating means connected to said parameter-responsive means,
    follower means,
    a mechanical coupling having lost-motion connecting said indicating means and said follower means,
    an on-off switch repeatedly actuated in proportion to movement of said follower means,
    a stepping switch having a plurality of contacts,
    an electric circuit including said on-off switch and said stepping switch and adapted to advance said stepping one unit upon each actuation of said on-off switch,
    a selector switch having contacts electrically connected to respective contacts of said stepping switch, and
    an electrical network including said selector switch and the pipeline valves and adapted to effect actuation of said valves when said stepping switch reaches a selected contact.

26. Apparatus for the automatic control of valves in a pipeline for switching of successive products flowing in the pipeline which comprises means connected to the pipeline substantially at the switching location responsive to a characteristic parameter whose value identifies the flowing product, indicating means connected to said parameter-responsive means, follower means, a mechanical coupling having lost-motion connecting said indicating means and said follower means, an on-off switch repeatedly actuated in proportion to movement of said follower means, a stepping switch having a home position and a plurality of contacts, an electric circuit including said on-off switch and said stepping switch and adapted to advance said stepping switch one unit upon each actuation of said on-off switch, a selector switch having contacts electrically connected to respective contacts of said stepping switch, a timer having electric timer contacts actuated upon expiration of a timed interval, an electric circuit including said stepping switch, timer, and timer contacts, and adapted to return said stepping switch to its home position upon expiration of the timed interval, and an electrical network including said selector switch and the pipeline valves and adapted to effect actuation of said valves when said stepping switch reaches a selected contact.

References Cited by the Examiner

UNITED STATES PATENTS

| | | | |
|---|---|---|---|
| 2,706,254 | 4/1955 | Mithoff et al. | 250—43.5 |
| 2,905,822 | 9/1959 | Peacock | 250—43.5 |
| 3,089,030 | 5/1963 | Scherbatskoy | 250—43.5 |

WILLIAM F. O'DEA, *Primary Examiner.*

D. ZOBKIW, *Assistant Examiner.*